United States Patent
Liu

(10) Patent No.: US 8,521,896 B2
(45) Date of Patent: Aug. 27, 2013

(54) METHOD AND SYSTEM FOR NEGOTIATING THE BIDIRECTIONAL FORWARDING DETECTION SESSION DISCRIMINATOR OF PSEUDO WIRE

(75) Inventor: Jun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1098 days.

(21) Appl. No.: 12/491,837

(22) Filed: Jun. 25, 2009

(65) Prior Publication Data

US 2010/0023632 A1    Jan. 28, 2010

Related U.S. Application Data

(63) Continuation of application No. PCT/CN2007/003004, filed on Oct. 19, 2007.

(30) Foreign Application Priority Data

Dec. 25, 2006  (CN) .......................... 2006 1 0161776

(51) Int. Cl.
*G06F 15/16* (2006.01)
(52) U.S. Cl.
USPC ............................ 709/230; 709/200; 370/352
(58) Field of Classification Search
USPC .......................... 709/230, 206, 200; 370/352
See application file for complete search history.

(56) References Cited

U.S. PATENT DOCUMENTS

| | | | |
|---|---|---|---|
| 2004/0156313 A1* | 8/2004 | Hofmeister et al. .......... | 370/229 |
| 2006/0209685 A1 | 9/2006 | Rahman et al. | |
| 2008/0037436 A1 | 2/2008 | Liu | |
| 2008/0037526 A1* | 2/2008 | Dong ............................. | 370/352 |

FOREIGN PATENT DOCUMENTS

| | | |
|---|---|---|
| CN | 1838620 | 9/2006 |
| CN | 1848775 | 10/2006 |
| CN | 1866923 A | 11/2006 |
| CN | 101212400 A | 7/2008 |

OTHER PUBLICATIONS

European Patent Office Communication pursuant to Article 94(3) EPC, European search opinion for Application No. 07816617.0, mailed Feb. 15, 2011, Huawei Technologies Co., Ltd.
Aggarwal, et al., draft-ietf-bfd-mpls-03: BFD for MPLS LSPs, Jun. 2006.
Nadeau, et al., draft-ietf-pwe3-vccv-00: Pseudo Wire (PW) Virtual Circuit Connection Verification (VCCV), Jul. 2003.

(Continued)

*Primary Examiner* — El Hadji Sall
(74) *Attorney, Agent, or Firm* — Staas & Halsey LLP

(57) ABSTRACT

A method, apparatus and system for negotiating the BFD session discriminator of the PW are disclosed. The method includes: a second equipment receives a negotiation message from a first equipment, where the message carries the BFD capability of VCCV of the PW at the first equipment and the BFD discriminator; and then sends to the first equipment a message which carries the BFD capability of the VCCV of the PW at the second equipment and the BFD discriminator allocated to the PW after obtaining the BFD capability and BFD discriminator from the first equipment if the local PW supports the BFD capability; or, sends to the first equipment a message which carries information indicating that the local PW does not support the BFD capability if the local PW does not support the BFD capability. Through this method, the process of negotiating the BFD session discriminator is simplified.

11 Claims, 6 Drawing Sheets

(56) References Cited

OTHER PUBLICATIONS

PCT International Preliminary Report on Patentability enclosing an English translation of the Written Opinion of the International Searching Authority for International application No. PCT/CN2007/003004, mailed Jan. 31, 2008, 4 pgs.

European Patent Office Communication enclosing the extended European search report, pursuant to Rule 62 EPC, the supplementary European search report (Art. 153(7) EPC) and the European search opinion for application No. 07816617.0, dated Dec. 3, 2009, 10 pgs.

Katz, D., et al. "Bidirectional Forwarding Detection", draft-ietf-bfd-base-04.txt, Network Working Group, Internet draft, Oct. 2005, 40 pgs.

L., et al. "Pseudowire Setup and Maintenance Using the Label Distribution Protocol (LDP)", Network Working Group, Requst for Comments: 4447, Category: Standards Track, Apr. 2006, 33 pgs.

Aggarwal, R., et al. "BFD for MPLS LSPs", draft-ietf-bfd-mpls-03.txt, Network Working Group, Internet Draft, Jun. 2006, 12 pgs.

Aggarwal, R., et al. "LDP Capabilities", draft-thomas-mpls-ldp-capabilities-01-txt, Network Working Group, Internet Draft, Oct. 2006, 14 pgs.

Nadeau, T., et al. Pseudo Wire Virtual Circuit Connectivity Verification (VCCV), draft-ietf-pwe3-vccv-11.txt, Network Working Group, Internet draft, Oct. 2006, 26 pgs.

Zhai, S., "BFD Initialization with BGP and Static Routes", draft-suping-bfd-static-app-02-txt, China Mobile Communications Corporation, BFD Working Group, Internet Draft, Jun. 2005, 5 pgs.

\* cited by examiner

US 8,521,896 B2

METHOD AND SYSTEM FOR NEGOTIATING THE BIDIRECTIONAL FORWARDING DETECTION SESSION DISCRIMINATOR OF PSEUDO WIRE

This application is a continuation of International Application No. PCT/CN2007/003004, filed on Oct. 19, 2007, which claims the benefit of Chinese Patent Application No. 200610161776.7, filed on Dec. 25, 2006, both of which are hereby incorporated by reference in their entireties.

FIELD OF THE INVENTION

The present invention relates to the communication field, and in particular, to a method and system for negotiating a Bidirectional Forwarding Detection (BFD) session discriminator of a pseudo wire in a Pseudo Wire Emulation Edge-to-Edge (PWE3) system.

BACKGROUND

The PWE3 technology is used for emulating the basic features of the services such as Asynchronous Transfer Mode (ATM), Frame Relay (FR), Ethernet, low-speed Time Division Multiplexing (TDM) circuit, and Synchronous Optical Network (SONET)/Synchronous Digital Hierarchy (SDH) in a Packet Switched Network (PSN). The functions of a Pseudo Wire (PW) include: encapsulating the Protocol Data Units (PDUs) of a specific service at the ingress, and bearing such PDUs on the path or tunnel between the ingress and egress, managing the timing and sequence of the PDUs, and providing the functions required for emulating the actions and features of such services as far as possible. As for users, a PW is only an independent link or circuit.

In a PWE3 system, the Customer Edge (CE) equipment is connected to the Provider Edge (PE) equipment through an Attachment Circuit (AC). Multiple PWs used for connecting two ACs are carried in a PSN tunnel between the two PEs of the two ACs. The AC is a physical circuit or virtual circuit. One AC may be a Data Link Connection Identifier (DLCI) of a Frame Relay (FR), a Virtual Path Identifier (VPI)/Virtual Channel Identifier (VCI) of an ATM, a port of an Ethernet, a Virtual Local Area Network (VLAN), a Point-to-Point Protocol (PPP) connection on a physical interface, or a Label Switched Path (LSP) of Multi-Protocol Label Switching (MPLS).

The BFD is a mechanism for quickly detecting whether a forwarding path between a pair of forwarding equipments is available. It provides a failure detection mechanism characterized by low cost and short detection periods between two adjacent systems, and covers detection of interfaces, data links and forwarding equipments. The BFD is similar to a "Hello" protocol. After a BFD session is set up between two systems that need to be detected, both parties send a BFD packet to the peer periodically, and detect the arrival of the packet from the peer periodically on the link where the BFD is applied. If no BFD packet is received from the peer within a specific interval, the link is regarded as faulty, thus detecting the link fault quickly.

In a PWE3 system, the PW is bidirectional. The PW works (in the "UP" status) only after the PWs of the same Pseudo Wire Identifier (PWID) are set up in both the ingress PE direction and the egress PE direction, and can constitute a BFD path properly. Both sides of the PW send BFD packets reciprocally. If a packet identified "down" is received from the peer or if no packet is received from the peer within a preset interval, the PW is regarded as faulty.

In the conventional art, a BFD session of a PW is set up through LSP ping auto negotiation. As defined in draft-ietf-bfd-mpls-03, the process of negotiating a BFD discriminator through an LSP ping is: The ingress PE sends its own discriminator through the LSP ping of the PW, and obtains the discriminator of the peer from the LSP ping response packet of the egress PE. The main process is as follows:

1. When configuring the PW, configuring the BFD-related parameters (such as minimum interval of sending packets, minimum interval of receiving packets), and Virtual Circuit Connection Verification (VCCV) capability parameters of the PW, including Connection Channel (CC) parameters (such as PW control word, alert label), and Connection Verification (CV) parameters (such as BFD capability).

2. Negotiating the BFD discriminator through the LSP ping after the PW is set up and the forwarding items are determined.

3. Setting up a BFD session after the BFD discriminator is negotiated successfully through the LSP ping.

4. Detecting whether the PW forwarding process fails according to the BFD session.

As shown in FIG. 1, the format of the Type Length Value (TLV) of the BFD discriminator carried in the LSP ping packet includes: Type, Length, and BFD discriminator.

The BFD session discriminator of the PW in the PWE3 system in the conventional art is negotiated through the LSP ping. When keeping the BFD configuration status consistent between the two equipments on the two ends of the PW, the system needs to consider the time sequence relation between the LSP ping and the PW connection/disconnection (up/down), thus increasing the complexity of system processing. The interworking routers have to support LSP ping, which leads to high consumption of the CPU resources of the equipment. The PEs at both sides of the PW are unable to perceive the BFD configuration status of the PW in time. Moreover, when the BFD configuration status of the two equipments at both sides of the PW is not symmetric, namely, when the equipment at one side of the PW cancels the BFD capability or adds the BFD capability during operation, the PW has to be disconnected, renegotiated and connected again, thus leading to traffic interruption and reducing efficiency of maintaining the PW.

SUMMARY

A method for negotiating BFD session discriminator of a PW, a communication system and communication equipment are provided in an embodiment of the present invention to solve the problem that the processing process is complicated because the BFD session discriminator of the PW is negotiated through an LSP ping in the conventional PWE3 system.

A method for negotiating BFD session discriminator of a PW in an embodiment of the present invention, including:

receiving, by the second equipment, a PW negotiation message from the first equipment, where the message carries the BFD capability of VCCV of the PW at the first equipment and the BFD discriminator allocated to the PW; and if the PW at the second equipment supports the BFD capability, sending, by the second equipment, to the first equipment a message which carries the BFD capability of the VCCV of the PW at the second equipment and the BFD discriminator allocated to the PW after obtaining the BFD capability and BFD discriminator from the first equipment; or, if the PW at the second equipment does not support the BFD capability, sending, by the second equipment, to the first equipment a message which carries information indicating that the PW at the second equipment does not support the BFD capability after obtaining the BFD capability and the BFD discriminator from the first equipment.

A communication equipment provided in an embodiment of the present invention includes:

a unit configured to send a PW negotiation message to other equipment, where the message carries the BFD capability of VCCV of the PW at the the local equipment and the BFD discriminator allocated to the PW; and a unit configured to receive the message from other equipment, where the message carries the BFD capability of VCCV of the PW at the other equipment and the BFD discriminator allocated to the PW.

A communication system provided in an embodiment of the present invention includes at least one first equipment and at least one second equipment, where:

data is transmitted between the first equipment and the second equipment through a PW connection;

the first equipment sends a PW negotiation message to the second equipment, in which the message carries the BFD capability of VCCV of the PW and the BFD discriminator;

if the PW at the second equipment supports the BFD capability, the second equipment sends to the first equipment a message that carries the BFD capability of the VCCV of the PW at the second equipment and the BFD discriminator after obtaining the BFD capability and BFD discriminator from the first equipment; or, if the PW at the second equipment does not support the BFD capability, the second equipment sends to the first equipment a message which carries information indicating that the PW at the second equipment does not support the BFD capability after obtaining the BFD capability and the BFD discriminator from the first equipment.

According to embodiments of the present invention, the first equipment sends a PW negotiation message to the second equipment, where the message carries the BFD capability of VCCV of the PW at the first equipment and the BFD discriminator. After receiving the BFD capability and BFD discriminator, the second equipment attaches the BFD capability of VCCV of the PW at the second equipment and the BFD discriminator to the message sent to the first equipment. In the PW negotiation process, the BFD discriminator is negotiated, without being dependent of the LSP ping. Therefore, the process of negotiating the BFD discriminator of the PW is simplified, the binding between the BFD session and the PW is simpler, and the efficiency of maintaining the PW is improved.

DETAILED DESCRIPTION

In order to overcome the low efficiency of setting up and maintaining the PW because of negotiating the BFD discriminator through the LSP ping in the conventional art, a PW setup process in an embodiment of the present invention observes the definition of the RFC4447, and negotiates the PW parameters and BFD discriminator through a Label Distribution Protocol (LDP). The BFD capability of VCCV and the BFD discriminator are extended in the PW setup label mapping message, and the LDP message sent to the peer equipment carries the information that the BFD capability is not supported, if the PW does not support the BFD capability. A status code of canceling the BFD capability dynamically is extended in the PW status information of the LDP notification message when the BFD capability status at both sides of the PW changes. The BFD capability of the PW herein refers to the BFD capability of VCCV of the PW.

Figure 1:
FIG. 1 shows a TLV format of a BFD discriminator in an LSP ping in the conventional art.
Figure 2:
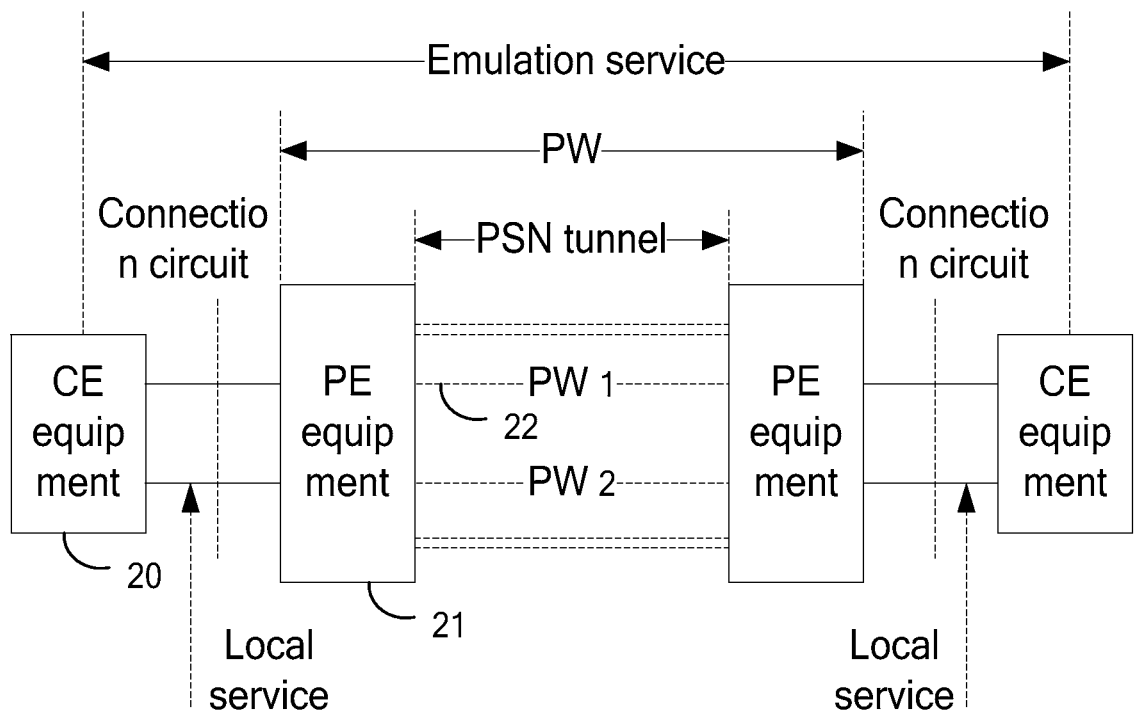
FIG. 2 shows a structure of a PWE3 system according to an embodiment of the present invention.

As shown in FIG. 2, a PWE3 system in an embodiment of the present invention includes multiple CEs 20 and multiple PEs 21. Data is transmitted between the PEs 21 through a PW 22 connection. In the process of setting a PW between two PEs 21, the BFD capability of VCCV of the PW of the local equipment and the BFD discriminator are carried in the LDP message. The PW parameters, BFD capability, and BFD discriminators of the PE21 at both sides of the PW are negotiated to set up a PW connection and set up a BFD session on the PW. When the PE21 at one side changes the BFD capability of the PW, the BFD capability status of the local PW is notified to the peer PE21.

Figure 3:
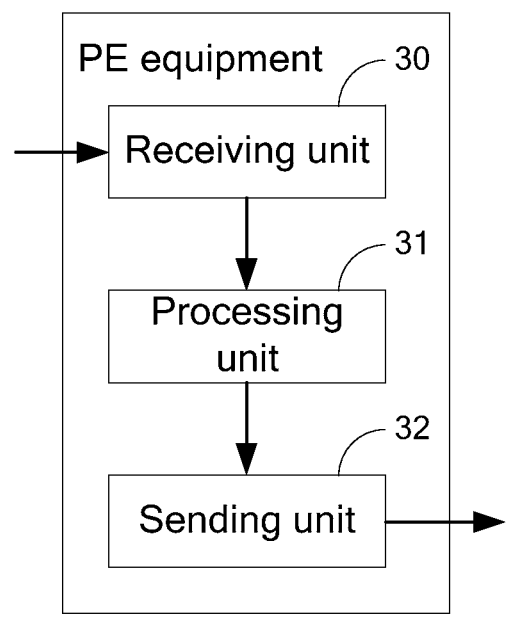
FIG. 3 shows a structure of a PE according to an embodiment of the present invention.

As shown in FIG. 3, the PE includes a receiving unit 30, a processing unit 31, and a sending unit 32, wherein:

the receiving unit 30 is configured to receive a message from a peer PE, where the message may be: an LDP negotiation message which carries the BFD capability of VCCV of the PW and the BFD discriminator, or an LDP negotiation message which carries information indicating that the BFD capability is not supported, or an LDP negotiation message which carries information on the BFD capability status of the PW;

the processing unit 31 is configured to: set up a PW at the local side; instruct the sending unit 32 to send an LDP negotiation message to the peer PE when it is necessary to negotiate the BFD discriminator, where the message carries the BFD capability of VCCV of the PW at the local side and the BFD discriminator; parse the message received by the receiving unit 30, and obtain the BFD capability and BFD discriminator of the PW at the peer PE from the message; compare the obtained BFD capability with the BFD capability of the PW at the local side, and instruct the sending unit 32 to send an LDP negotiation message to the peer PE according to the comparison result; and, when detecting change of the BFD capability of the PW at the local side, instruct the sending unit 32 to send an LDP notification message to the peer PE, where the message carries the BFD capability status information;

after receiving the LDP negotiation message which carries the BFD capability of VCCV of the PW at the peer PE and the BFD discriminator, the receiving unit 30 attaches the BFD capability and the BFD discriminator of the PW at the local side into an LDP negotiation message if the PW at the local side supports the BFD capability, and instructs the sending unit 32 to send the LDP negotiation message carrying the BFD capability and the BFD discriminator of the PW at the local side. If the PW is not configured with or does not support the BFD capability at the local side, the receiving unit 30 attaches the information indicating that the PW at the local side does not support the BFD capability into the LDP message, where the information is identified by a status code in the "LDP Status Code" field in the LDP message. After receiving the LDP negotiation message, which carries the information indicating that the BFD capability is not supported, from the peer PE, the receiving unit 30 cancels the negotiation of the BFD discriminator of the PW. After receiving the LDP notification message which carries the information on the BFD capability status of the PW at the peer PE, the receiving unit 30 adjusts the BFD capability of the PW at the local side according to the BFD capability status information in the notification message; and the sending unit 32 is configured to send the corresponding LDP negotiation message or LDP notification message to the peer PE according to the instructions of the processing unit 31.

Figure 4:
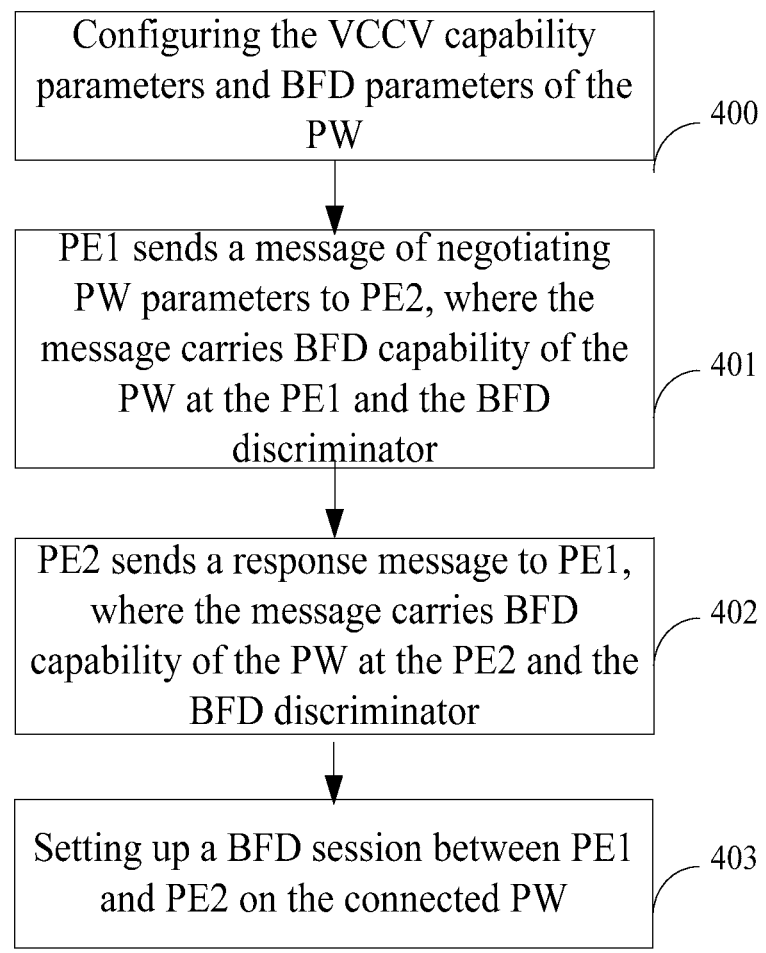
FIG. 4 is a flowchart of setting up a BFD session according to an embodiment of the present invention.

In this embodiment, if VCCV capability parameters are configured at the time of setting up the PW, a BFD discriminator is added along with the Interface Parameter Sub-TLV of the PW. As shown in FIG. 4, the process of triggering setup of a BFD session through LDP negotiation in this embodiment is as follows:

Step 400: VCCV capability parameters and the BFD parameters of the PW are configured.

Step 401: Through the LDP, the PE1 sends a message of negotiating PW parameters to the PE2 on the PW, where the message carries the BFD capability and BFD discriminator of the PW at the PE1.

Step 402: The PE2 obtains the BFD capability and BFD discriminator of the PW at the PE1 from the message, and sends to the PE1 an LDP message which carries the BFD capability and BFD discriminator of the PW at the PE2.

Step 403: The PE1 and PE2 negotiate the PW parameters successfully, and set up a PW connection (which is in the UP status). If the BFD discriminator of the PW is obtained through negotiation in steps 401 and step 402, the setup of a BFD session of the PW is triggered, the BFD parameters are negotiated further, and the BFD performs fault detection for the bidirectional PW; otherwise, the PE1 and PE2 negotiate the BFD discriminator again.

Figure 5:
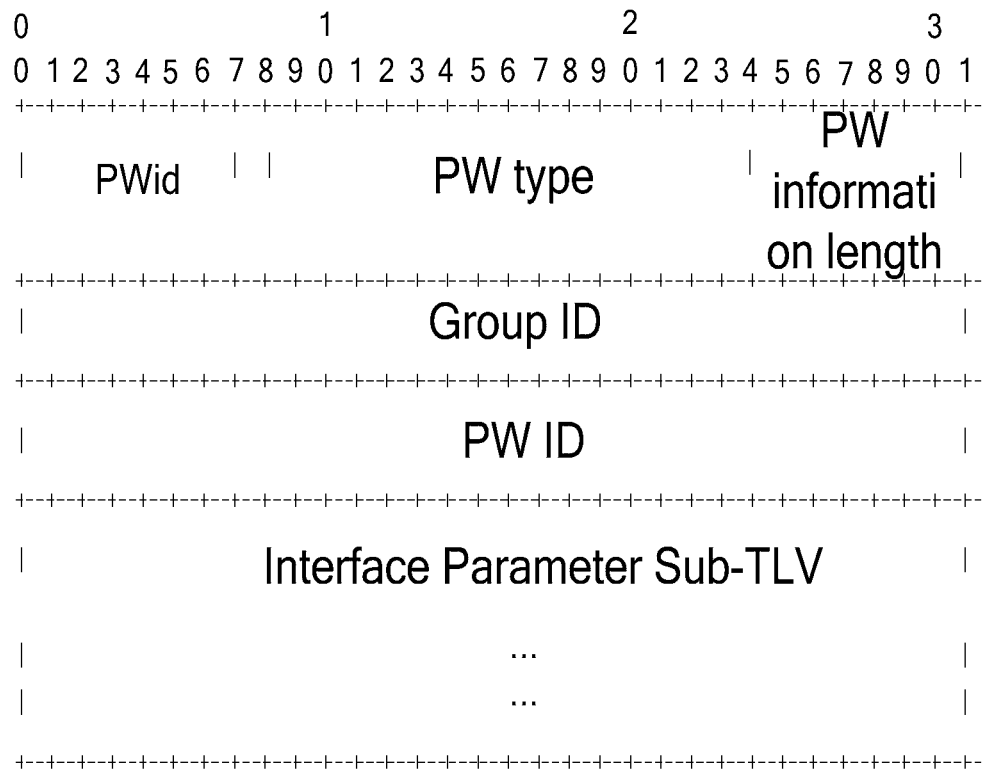
FIG. 5 shows a PWid FEC TLV format according to an embodiment of the present invention.
Figure 6:
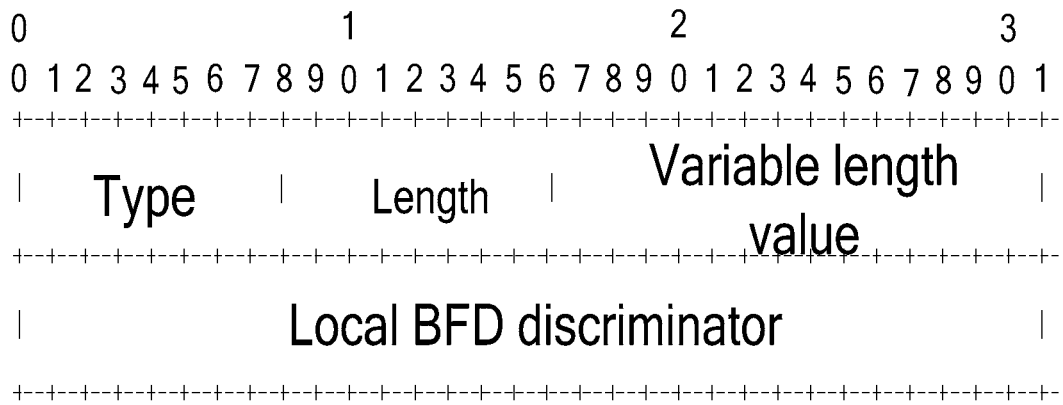
FIG. 6 shows a Sub-TLV format of a BFD discriminator according to an embodiment of the present invention.

As shown in FIG. 5, the format of a PW identifier Forwarding Equivalent Class Element (PWid FEC Element) in an LDP message exchanged in the process of negotiation between PE1 and PE2 in this embodiment includes: PW identifier (PWid) (0×80), control bit (C), PW Type, PW Info Length, Group ID, PW ID, and Interface Parameter Sub-Type Length Value (Sub-TLV). The Interface Parameter Sub-TLV is a necessary value for capability interaction between the ingress PE and egress PE, and multiple Interface Parameter Sub-TLV values may be included. Therefore, in this embodiment, the BFD is defined as a capability of the PW, and a Sub-TLV of a BFD discriminator is added in the Interface Parameter Sub-TLV field. As shown in FIG. 6, the format of the Sub-TLV of the BFD discriminator includes: "Sub-TLV Type", "Length", "Variable Length Value", and "My BFD Discriminator".

In the negotiation process, if the PW of the local PE is not configured with or does not support the BFD capability of the VCCV, an LDP message which carries information indicating that the PW at the local PE does not support BFD capability is sent to the peer device. The LDP message uses a status code in the "LDP Status Code" field to indicate that the PW at the local PE is not configured with or does not support the BFD capability. In this case, it is necessary to apply to the Internet Assigned Number Authority (IANA) for a new LDP Status code with the E bit being 0, indicating that the PW is not configured with or does not support the BFD capability of the VCCV. Currently, the LDP Status Codes defined by the RFC 4447 are as follows:

| Range/Value | E | Description | Reference |
|---|---|---|---|
| 0x00000024 | 0 | Illegal C-Bit | [RFC4447] |
| 0x00000025 | 0 | Wrong C-Bit | [RFC4447] |
| 0x00000026 | 0 | Incompatible bit-rate | [RFC4447] |
| 0x00000027 | 0 | CEP-TDM mis-configuration | [RFC4447] |
| 0x00000028 | 0 | PW Status | [RFC4447] |
| 0x00000029 | 0 | Unassigned/Unrecognized TAI | [RFC4447] |
| 0x0000002A | 0 | Generic Misconfiguration Error | [RFC4447] |
| 0x0000002B | 0 | Label Withdraw PW Status Method | [RFC4447] |

In this embodiment, the LDP message for PW negotiation carries the BFD discriminator so that it is not necessary to negotiate the BFD discriminator through the LSP ping after success of negotiating the PW parameters, thus simplifying the process of negotiating the BFD discriminator.

Figure 7:
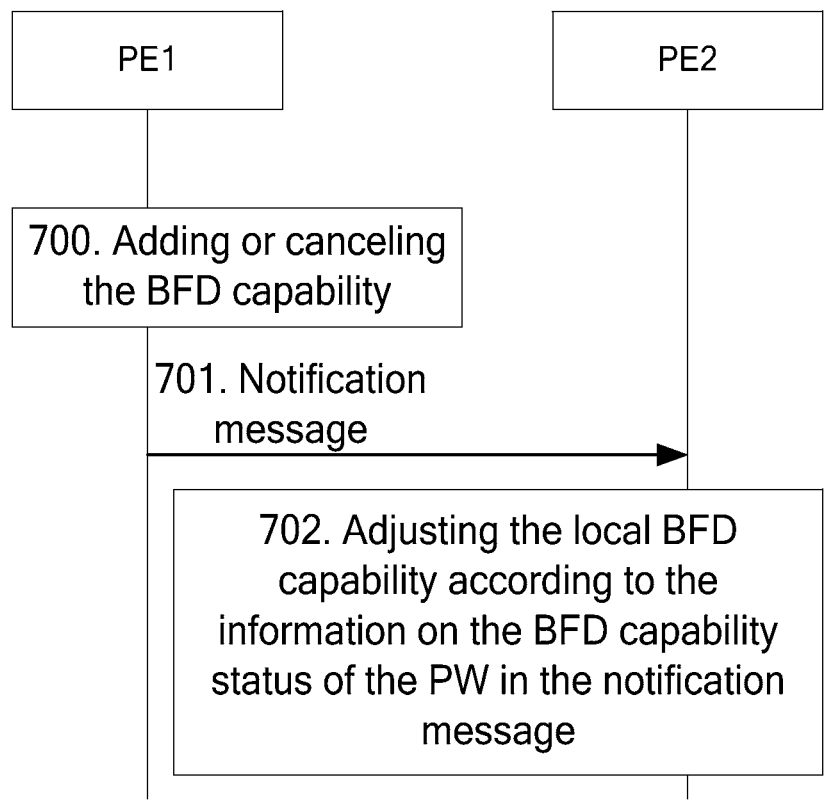
FIG. 7 is a flowchart of notifying the peer equipment when a PE changes the BFD capability of VCCV of the PW according to an embodiment of the present invention.

After the BFD session of the PW is set up, if the BFD capability of the VCCV is not symmetric between the PEs at both sides of the PW, namely, if the equipment at one side cancels the BFD capability of the VCCV, the information about change of the BFD capability status needs to be notified to the peer equipment. This embodiment supposes that the PE1 changes the BFD capability of the VCCV of the PW at the local side. As shown in FIG. 7, the implementation process includes the following steps:

Step 700: The PE1 adds or cancels the BFD capability of the VCCV of the PW at the local side.

Step 701: The PE1 sends an LDP Notification message to the PE2, where the message carries information on the BFD capability status of the PW.

Step 702: According to the BFD capability status information code, the PE2 processes the local BFD capability. An optional processing mode is: If the PE1 adds the BFD capability, the PE2 adds the corresponding BFD capability at the local side, and negotiates the BFD discriminator of the PW with the PE1; if the PE1 cancels the BFD capability, the PE2 cancels the corresponding BFD capability at the local side.

Figure 8:
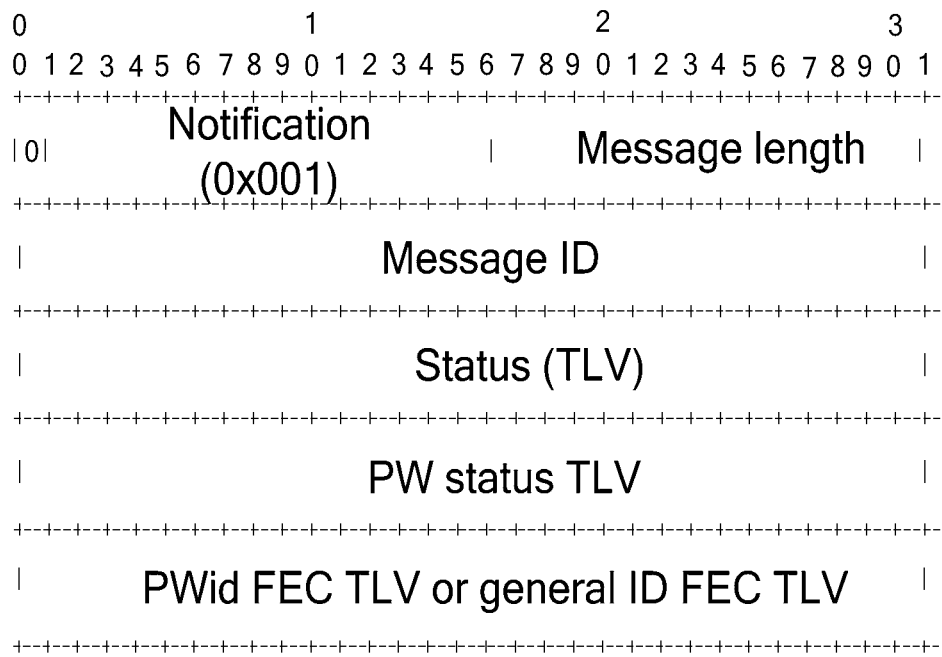
FIG. 8 shows a format of a notification message according to an embodiment of the present invention.
Figure 9:
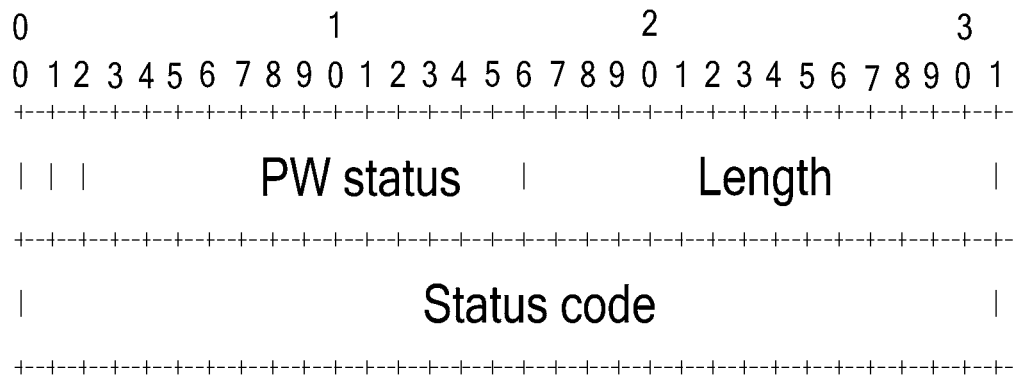
FIG. 9 shows a PW Status TLV format according to an embodiment of the present invention.

As shown in FIG. 8, the format of the LDP Notification message in this embodiment includes: notification type (Notification(0×0001)), Message Length, Message ID, Status TLV, PW Status TLV, and FEC TLV. The algorithm of the PW Status TLV needs to be negotiated when the PW is set up initially. If the PE supports the PW Status TLV, the initial label mapping message carries the PW Status TLV. In this embodiment, the BFD capability status information is identified by a status code in the "PW Status TLV" field. As shown in FIG. 9, the format of a PW Status TLV includes: PW Status, Length, and Status Code, where the Status Code is requested from the IANA. In this embodiment, a status code which identifies addition or cancellation of the BFD capability is requested from the IANA.

In this embodiment, when the equipment at one side adds or cancels the BFD capability, an LDP Notification message is sent to the peer equipment to indicate that the BFD capability status has changed. Therefore, the BFD of the equipment is prevented from reporting PW faults mistakenly due to lack of symmetry of the BFD session between the equipment at one side and the equipment at the other side. In this embodiment, the BFD capability can be added or cancelled during operation of the equipment, without the need of disconnecting the PW, renegotiating the PW and connecting it again, thus avoiding traffic interruption and improving efficiency of maintaining the PW of the system.

It is apparent that those skilled in the art can make various modifications and variations to the present invention without departing from the spirit and scope of the present invention. The present invention is intended to cover such modifications and variations provided that they fall in the scope of protection defined by the following claims or their equivalents.

What is claimed is:

1. A method for negotiating a Bidirectional Forwarding Detection (BFD) session discriminator of a Pseudo Wire (PW), comprising:

receiving, by a second equipment, a PW negotiation message from a first equipment, wherein the message carries BFD capability of Virtual Circuit Connection Verification (VCCV) of the PW at the first equipment and the BFD discriminator allocated to the PW; and if the PW at the second equipment supports the BFD capability, sending, by the second equipment, to the first equipment a message which carries the BFD capability of the VCCV of the PW at the second equipment and the BFD discriminator allocated to the PW after obtaining the BFD capability and the BFD discriminator from the first equipment; or, if the PW at the second equipment does not support the BFD capability, sending, by the second equipment, to the first equipment a message which carries information indicating that the PW at the second equipment does not support the BFD capability after obtaining the BFD capability and the BFD discriminator from the first equipment;

wherein the first equipment negotiates with the second equipment through a Label Distribution Protocol (LDP) message;

wherein the first equipment and the second equipment set up a BFD session on the connected PW after obtaining the BFD capability of the VCCV of the PW at the peer equipment and the BFD discriminator from the peer equipment;

wherein a notification message is sent to the peer equipment when the BFD capability of the VCCV of the PW at the first equipment or second equipment changes; and the peer equipment that receives the notification message adjusts the BFD capability of the PW at the local equipment according to information on a BFD capability status of the PW in the message.

2. The method of claim 1, wherein a Sub Type Length Value (Sub-TLV) of the BFD discriminator is added in an "Interface Parameter Sub-TLV" field of the LDP message; and the Sub-TLV of the BFD discriminator comprises these fields: "Sub-TLV Type", "Length", "Variable Length Value", and "My BFD Discriminator".

3. The method of claim 1, wherein a status code identifying that the local equipment does not support the BFD capability is added in an "LDP Status Code" field of the LDP message.

4. The method of claim 1, wherein a PW status code identifying the BFD capability status of the PW is added in a "PW Status TLV" field of the notification message.

5. A communication equipment, comprising:

a unit, configured to send a Pseudo Wire (PW) negotiation message to other equipment, wherein the message carries Bidirectional Forwarding Detection (BFD) capability of Virtual Circuit Connection Verification (VCCV) of the PW at the local equipment and a BFD discriminator allocated to the PW;

a unit, configured to receive a message from the other equipment, wherein the message carries the BFD capability of the VCCV of the PW at the other equipment and the BFD discriminator allocated to the PW;

a unit, configured to send a message which carries information indicating that the local equipment does not support the BFD capability to the other equipment when the PW at the local equipment is not configured with or does not support the BFD capability; and a unit, configured to cancel negotiation of the BFD discriminator of the PW after receiving the message which carries information indicating that the other equipment does not support the BFD capability.

6. A communication equipment, comprising:

a unit, configured to send a Pseudo Wire (PW) negotiation message to other equipment, wherein the message carries Bidirectional Forwarding Detection (BFD) capability of Virtual Circuit Connection Verification (VCCV) of the PW at the local equipment and a BFD discriminator allocated to the PW;

a unit, configured to receive a message from the other equipment, wherein the message carries the BFD capability of the VCCV of the PW at the other equipment and the BFD discriminator allocated to the PW;

a unit, configured to notify a BFD capability status of the PW to the other equipment when the BFD capability of the VCCV of the PW at the local equipment changes; and a unit, configured to adjust the BFD capability of the local equipment according to information about the BFD capability status of the PW in a notification about the BFD capability status of the PW after receiving the notification from the other equipment.

7. The communication equipment of claim 6, wherein the communication equipment negotiates with the other equipment through a Label Distribution Protocol (LDP) message.

8. A communication system, comprising at least one first equipment and at least one second equipment between which data is transmitted through a Pseudo Wire (PW) connection, wherein:

the first equipment sends a PW negotiation message to the second equipment, in which the message carries Bidirectional Forwarding Detection (BFD) capability of Virtual Circuit Connection Verification (VCCV) of the PW and a BFD discriminator; and if a PW at the second equipment supports the BFD capability, the second equipment sends to the first equipment a message which carries the BFD capability of the VCCV of the PW at the second equipment and the BFD discriminator after obtaining the BFD capability and the BFD discriminator from the first equipment, or, if the PW at the second equipment does not support the BFD capability, the second equipment sends to the first equipment a message which carries information indicating that the PW at the second equipment does not support the BFD capability after obtaining the BFD capability and the BFD discriminator from the first equipment;

wherein the first and second equipment negotiate with each other through a Label Distribution Protocol (LDP);

wherein the first equipment and the second equipment set up a BFD session on a connected PW after obtaining the BFD capability of the VCCV of the PW at a peer side and the BFD discriminator;

wherein a notification message is sent to peer equipment when the BFD capability of the VCCV of the PW at the first equipment or second equipment changes; and the peer equipment that receives the notification message adjusts the BFD capability of the local equipment according to information on a BFD capability status of the PW in the message.

9. A communication system, comprising at least one first equipment and at least one second equipment between which data is transmitted through a Pseudo Wire (PW) connection, wherein:

the first equipment sends a PW negotiation message to the second equipment, in which the message carries Bidirectional Forwarding Detection (BFD) capability of Virtual Circuit Connection Verification (VCCV) of the PW and a BFD discriminator; and if a PW at the second equipment supports the BFD capability, the second equipment sends to the first equipment a message which carries the BFD capability of the VCCV of the PW at the second equipment and the BFD discriminator after obtaining the BFD capability and the BFD discriminator from the first equipment, or, if the PW at the second equipment does not support the BFD capability, the second equipment sends to the first equipment a message which carries information indicating that the PW at the second equipment does not support the BFD capability after obtaining the BFD capability and the BFD discriminator from the first equipment;

wherein each of the first equipment and second equipment comprises:

a unit, configured to send a PW negotiation message to the peer equipment, wherein the message carries the BFD capability of the VCCV of the PW at the local equipment and the BFD discriminator allocated to the PW; and a unit, configured to receive a message from the peer equipment, wherein the message carries the BFD capability of the VCCV of the PW at the peer equipment and the BFD discriminator allocated to the PW.

10. The communication system of claim 9, wherein each of the first equipment and second equipment further comprises:

a unit, configured to send a message which carries information indicating that the local equipment does not support the BFD capability to the peer equipment when the PW at the local equipment is not configured with or does not support the BFD capability; and a unit, configured to cancel negotiation of the BFD discriminator of the PW after receiving the message which carries information indicating that the peer equipment does not support the BFD capability.

11. The communication system of claim 10, wherein each of the first equipment and second equipment further comprises:

a unit, configured to notify the BFD capability status of the PW to the peer equipment when the BFD capability of the VCCV of the PW at the local equipment changes; and a unit, configured to adjust the BFD capability of the local equipment according to information about the BFD capability status of the PW in a notification about the BFD capability status of the PW after receiving the notification from the peer equipment.

* * * * *